US009617906B2

(12) United States Patent
Lee

(10) Patent No.: US 9,617,906 B2
(45) Date of Patent: Apr. 11, 2017

(54) COOLANT CONTROL VALVE OF ENGINE

(71) Applicants: Hyundai Motor Company, Seoul (KR); Kia Motors Corporation, Seoul (KR)

(72) Inventor: Philgi Lee, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 129 days.

(21) Appl. No.: 14/557,239

(22) Filed: Dec. 1, 2014

(65) Prior Publication Data

US 2016/0010535 A1    Jan. 14, 2016

(30) Foreign Application Priority Data

Jul. 8, 2014 (KR) .......................... 10-2014-0084942

(51) Int. Cl.
| F16K 11/00 | (2006.01) |
| F01P 7/14 | (2006.01) |
| F01P 3/20 | (2006.01) |
| F16K 11/087 | (2006.01) |

(52) U.S. Cl.
CPC ...... *F01P 7/14* (2013.01); *F01P 3/20* (2013.01); *F16K 11/0876* (2013.01)

(58) Field of Classification Search
CPC ... F01P 3/20; F01P 7/14; F16K 11/076; F16K 11/0856; F16K 27/041; F16K 31/041; F16K 5/181; Y10T 137/6579; Y10T 137/86493; Y10T 137/86863; Y10T 137/86871; Y10T 137/87249

USPC ..................................................... 123/41.08
See application file for complete search history.

(56) References Cited

U.S. PATENT DOCUMENTS

| 4,427,057 A * | 1/1984 | Bouvot .............. B60H 1/00485 |
| | | 123/41.08 |
| 5,529,026 A * | 6/1996 | Kurr .................. B60H 1/00485 |
| | | 123/41.1 |
| 6,539,899 B1 * | 4/2003 | Piccirilli ................. F01P 7/167 |
| | | 123/41.08 |

(Continued)

FOREIGN PATENT DOCUMENTS

| JP | 2008-255852 A | 10/2008 |
| JP | 2013-177843 A | 9/2013 |

(Continued)

*Primary Examiner* — Jessica Cahill
(74) *Attorney, Agent, or Firm* — Morgan, Lewis & Bockius LLP

(57) ABSTRACT

A coolant control valve of an engine may include a cylindrical valve in which a space is formed along a length directional center axis thereof, a first inlet through which a coolant flows being formed at one end of the cylindrical valve, an outlet being formed at an outer surface of the cylindrical valve in the space, a first convex surface and a second convex surface and a second inlet through which the coolant flows into the space being formed at the outer surface corresponding to a recess portion formed between the first convex surface and the second convex surface, a valve housing, a first inflow pipe transmitting the coolant to the space through the first inlet, a second inflow pipe transmitting the coolant to the space through the second inlet, and a driver provided at one side of the valve housing to rotate the cylindrical valve.

9 Claims, 4 Drawing Sheets

(56) References Cited

U.S. PATENT DOCUMENTS

| | | | | |
|---|---|---|---|---|
| 7,165,513 B2 * | 1/2007 | Humburg | ........... | B60H 1/00485 |
| | | | | 123/41.08 |
| 7,169,397 B2 * | 1/2007 | Dowling | .............. | A61K 39/145 |
| | | | | 424/204.1 |
| 7,255,130 B2 * | 8/2007 | Martins | .............. | B60H 1/00485 |
| | | | | 123/41.08 |
| 2013/0263949 A1 * | 10/2013 | Bartnick | ............ | F16K 11/0856 |
| | | | | 137/625 |
| 2016/0003126 A1 * | 1/2016 | Carns | ........................ | F01P 7/14 |
| | | | | 123/41.44 |
| 2016/0010536 A1 * | 1/2016 | Murakami | ............ | F16K 11/085 |
| | | | | 137/625.44 |

FOREIGN PATENT DOCUMENTS

| | | | |
|---|---|---|---|
| KR | 10-2009-0065294 A | 6/2009 | |
| KR | 10-2013-0019172 A | 2/2013 | |
| WO | WO 2014130280 A1 * | 8/2014 | ................ F01P 7/14 |

* cited by examiner

COOLANT CONTROL VALVE OF ENGINE

CROSS-REFERENCE TO RELATED APPLICATION

The present application claims priority to Korean Patent Application No. 10-2014-0084942 filed Jul. 8, 2014, the entire contents of which is incorporated herein for all purposes by this reference.

BACKGROUND OF THE INVENTION

Field of the Invention

The present invention relates to a coolant control valve of an engine, controlling coolants for a cylinder head, a bank of cylinder, a radiator, a throttle body, a heater, an automatic transmission fluid warmer, and the like for improving cooling efficiency and reducing fuel consumption.

Description of Related Art

An engine generates rotation force from combustion of fuel, and the remaining energy from the combustion of the fuel is exhausted as heat energy. In particular, a coolant absorbs heat energy while circulating through the engine, a heater, and a radiator, and discharges the absorbed heat energy to the outside.

When a coolant temperature of the engine is low, viscosity of the oil is increased so that a frictional force is increased, fuel consumption is increased, and a temperature of an exhaust gas is slowly increased so that time for activation of a catalyst is extended, and accordingly, quality of the exhaust gas may be deteriorated. Furthermore, time for normalization of operation of the heater is extended so that a passenger or a driver may feel cold.

When the coolant temperature of the engine is excessively high, knocking occurs, and ignition timing needs to be adjusted for suppression of the occurrence of knocking, thereby causing operation deterioration. In addition, when a temperature of lubricant is excessively high, lubrication performance may be deteriorated.

Thus, one integrated flow control valve that controls several cooling elements is applied to maintain a temperature of the coolant at a specific portion of the engine to be high and a temperature of the coolant at other portions to be low.

In particular, a flow path of the coolant is complex because left and right cylinder heads and left and right cylinder banks are separately cooled, and thus studies on an integrated flow control valve that can respectively control the cylinder heads and the cylinder banks are continuing.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a coolant control valve of an engine while maintaining its entire size to be small by enhancing a characteristic of a port through which a coolant flows in and respectively controlling the coolant flowing to the left and right of the engine.

According to various aspects of the present invention, a coolant control valve of an engine may include a cylindrical valve in which a space is formed along a length directional center axis thereof, a first inlet through which a coolant flows being formed at one end cylindrical valve, an outlet being formed at an outer surface of the cylindrical valve in the space, a first convex surface and a second convex surface being sequentially formed along the length direction in an exterior circumferential surface of the cylindrical valve, and a second inlet through which the coolant flows into the space being formed at the outer surface corresponding to a recess portion formed between the first convex surface and the second convex surface, a valve housing in which the cylindrical valve is provided to be rotatable with respect to the center axis, a first inflow pipe connected to the valve housing and transmitting the coolant to the space through the first inlet, a second inflow pipe connected to the valve housing and transmitting the coolant to the space through the second inlet, and a driver provided at one side of the valve housing to rotate the cylindrical valve with respect to the center axis.

The coolant control valve of the engine may further include an outlet pipe connected to the valve housing corresponding to the outlet and transmitting the coolant from the space to the outside through the outlet, a sealing member to which an end of the outlet pipe is inserted, and a front end surface of the sealing member is formed to correspond to one of the first convex surface or the second convex surface of the cylindrical valve, and an elastic member elastically supporting the sealing member so as to be closely attached to one of the first convex surface or the second convex surface.

The outlet may include a first outlet and a second outlet, and the outlet pipe may include a first outlet pipe corresponding to the first outlet and a second outlet pipe corresponding to the second outlet.

One of the first outlet pipe or the second outlet pipe may be connected with a radiator that cools the coolant, and the other of the first outlet pipe or the second outlet pipe may be connected with several cooling lines including to a heater heating air inside a vehicle, to a throttle body disposed to control an amount of intake, to an automatic transmission fluid warmer provided to heat transmission oil.

One of the first inflow pipe or the second inflow pipe may be connected with a right cylinder bank and a right cylinder head, and the other of the first inflow pipe or the second inflow pipe may be connected with a left cylinder bank and a left cylinder head.

The sealing member may have a cylindrical pipe structure in which a front end of the outlet pipe is inserted, and the elastic member may be a wave spring and may be provided along an exterior circumferential surface of the outlet pipe to elastically support the sealing member.

A curved surface having a predetermined curvature radius for smooth inflow of the coolant may be formed at an edge where the second inlet is formed in the outer surface of the cylindrical valve.

The driver may include a motor housing provided adjacent to the valve housing and a motor installed in the motor housing to rotate the cylindrical valve.

The first convex surface, the second convex surface, and the recess portion may be sequentially formed along a rotation direction of the cylindrical valve, and the second inlet may be formed with a predetermined gap along the recess portion.

According to the present invention, the first inflow pipe and the second inflow pipe are additionally provided to increase a degree of freedom in design, reduce flow resistance of the coolant of the engine having the left and right cylinder heads and the left and right cylinder banks, and separately control the coolant.

In addition, the second inflow pipe is connected with the recess portion formed between the first convex surface and the second convex surface, and the flow resistance is reduced by forming the second inlet in the cylindrical valve corresponding to the recess portion, and the coolant can be more stably circulated.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
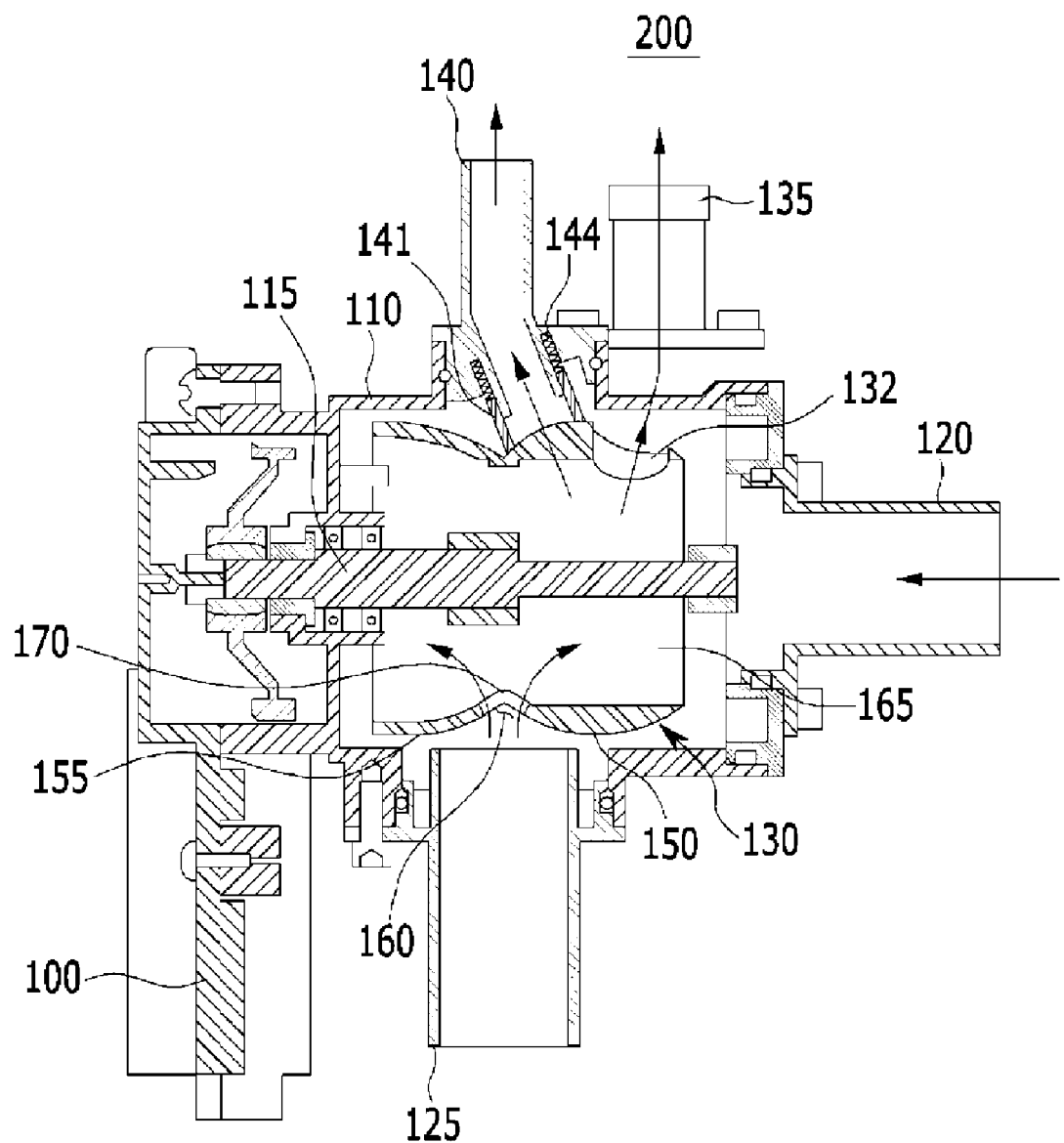
FIG. 1 is an overall cross-sectional view of an exemplary coolant control valve of an engine according to the present invention.

FIG. 1 is an overall cross-sectional view of a coolant control valve of an engine according to various embodiments of the present invention.

Referring to FIG. 1, a control valve of an engine includes a motor housing 100, a rotation load 115, a cylindrical valve 130, a valve housing 110, a first inflow pipe 120, a second inflow pipe 125, a first outlet pipe 135, and a second outlet pipe 140.

The rotation load 115 is provided along a length directional center shaft in the valve housing 110, and the cylindrical valve 130 is provided at a predetermined distance from the rotation load 115.

The motor housing 100 is provided in a lower left portion of the valve housing 110, and a motor is installed in the motor housing 100. The cylindrical valve 130 is mounted into the valve housing 110 such that the cylindrical valve 130 rotates together with the rotation load 115 by the motor.

The first inflow pipe 120 and the second inflow pipe 125 through which a coolant flows are engaged to the valve housing 110. The first inflow pipe 120 is coaxially disposed with the rotation load 115, and supplies the coolant to an inner space of the cylindrical valve 130 through a first inlet 165 formed in a center portion in a right end of the cylindrical valve 130.

The second inflow pipe 125 is connected to a lower outer surface of the valve housing 110, and supplies the coolant between an exterior circumference of the cylindrical valve 130 and an interior circumference of the valve housing 110.

In more detail, a first convex surface 150 and a second convex surface 155 are formed at a distance from each other along a length direction at the exterior circumference of the cylindrical valve 130. The first convex surface 150 and the second convex surface 155 are sequentially formed along a rotation direction of the cylindrical valve 130.

A recess portion 160 formed in the shape of a recess groove is provided between the first convex surface 150 and the second convex surface 155, and a second inlet 170 connected to the inside of the cylindrical valve 130 is formed in the recess portion 160. The recess portion 160 may be continuously formed along the rotation direction of the cylindrical valve 130.

The coolant supplied to the recess portion 160 in the valve housing 110 through the second inflow pipe 125 is supplied to an inner space of the cylindrical valve 130 through the second inlet 170.

The coolant supplied into the valve housing 110 through the first inflow pipe 120 and the second inflow pipe 125 selectively circulates through one end and the other end of the engine through the first outlet pipe 135 and the second outlet pipe 140 according to a rotation position of the cylindrical valve 130.

The first outlet pipe 135 and the second outlet pipe 140 may be disposed in different locations along a rotation direction of the cylindrical valve 130.

In more detail, an elastic member 144 and a sealing member 141 are provided at a front end of the second outlet pipe 140.

A front end surface of the second outlet pipe 140 is separated by a predetermined gap from the exterior circumference of the cylindrical valve 130, and the sealing member 141 and the second outlet pipe 140 form a sealing structure between the second outlet pipe 140 and the exterior circumference of the cylindrical valve 130.

The sealing member 141 is formed in the shape of a short cylinder, and a front end surface of the sealing member 141 is formed in the shape of a curved line that is closely attached to the first convex surface 150 and an interior circumferential surface of a rear end of the sealing member 141 is closely attached to an exterior circumferential surface of a front end of the second outlet pipe 140 so as to be slidable thereto.

In addition, the elastic member 144 elastically supports the sealing member 141 toward the cylindrical valve 130 with reference to the second outlet pipe 140 to thereby improve the sealing structure between the sealing member 141 and the cylindrical valve 130. In various embodiments of the present invention, the elastic member 144 may be a wave spring type or a coil spring type.

An outlet 132 is formed in the cylindrical valve 130 corresponding to the first outlet pipe 135 and the second outlet pipe 140, and the outlet 132 supplies the coolant into the cylindrical valve 130 through the first outlet pipe 135 or the second outlet pipe 140 according to the rotation position of the cylindrical valve 130.

In FIG. 1, when only the first inflow pipe 120 is provided, a degree of freedom in design is deteriorated, flow resistance of the coolant is increased in the engine having the left and right cylinder heads and the left and right cylinder banks, and the coolant flowing to the left and right of the engine cannot be separately controlled.

However, in various embodiments of the present invention, the first inflow pipe 120 and the second inflow pipe 125 are additionally provided to increase the degree of freedom in design, the flow resistance of the coolant in the engine having the left and right cylinder heads and the left and right cylinder banks can be reduced, and the coolant flowing to the left and right of the engine can be separately controlled.

Also, the second inflow pipe 125 is connected with the recess portion 160 formed between the first convex surface 150 and the second convex surface 155 in the cylindrical valve 130, and the second inlet 170 is formed in the cylindrical valve 130 corresponding to the recess portion 160 so that the flow resistance can be reduced and the coolant can be more stably circulated.

Figure 2:
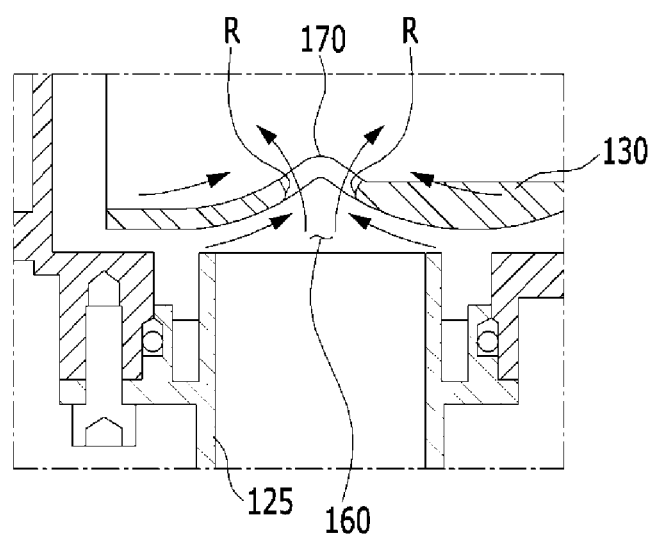
FIG. 2 is a partially detailed cross-sectional view of the exemplary coolant control valve of the engine according to the present invention.

FIG. 2 is a partially detailed cross-sectional view of the coolant control valve of the engine according to various embodiments of the present invention.

Referring to FIG. 2, in the second inlet 170, a curved surface having a predetermined curvature radius R is formed at an edge that corresponds to the exterior circumferential surface of the cylindrical valve 130 for smooth flow of the coolant. In addition, the second inlet 170 may be provided in plural with a predetermined gap therebetween along the rotation direction of the cylindrical valve 130.

Figure 3:
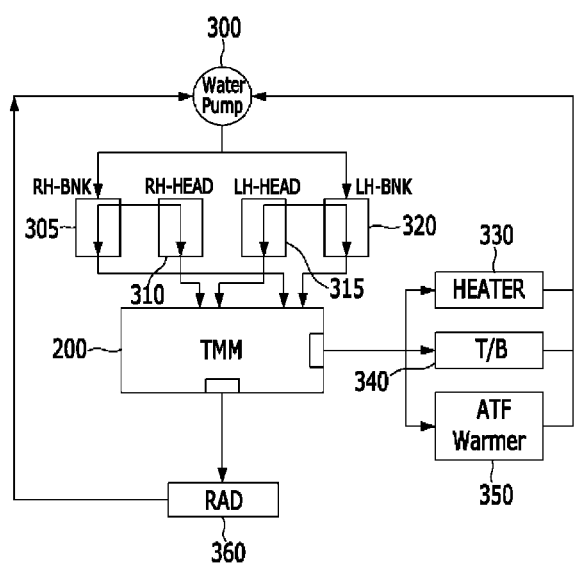
FIG. 3 is a schematic diagram showing a coolant flow of the engine according to the present invention.

FIG. 3 is a schematic diagram of coolant flow in the engine according to various embodiments of the present invention.

Referring to FIG. 3, the engine includes a right cylinder bank 305, a right cylinder head 310, a left cylinder bank 320, a left cylinder head 315, a coolant control valve 200, a radiator 360, a heater 330, a throttle body (T/B) 340, an automatic transmission fluid warmer 350, and a coolant pump 300.

As shown in the drawing, the coolant control valve 200 is disposed to selectively supply the coolant to the radiator 360. In addition, the coolant control valve 200 is disposed to selectively supply the coolant to the heater 330, the throttle body 340, and the automatic transmission fluid warmer 350.

The coolant passing through the radiator 360, the heater 330, the throttle body 340, and the automatic transmission fluid warmer 350 circulates through the coolant control valve 200 again by the coolant pump 300 through the right cylinder bank 305, the right cylinder head 310, the left cylinder bank 320, and the left cylinder head 315.

The coolant exhausted from the right cylinder bank 305 and the left cylinder bank 320 are separately supplied to one side of the coolant control valve 200, and the coolant exhausted from the right cylinder head 310 and the left cylinder head 315 are separately supplied to the other side of the coolant control valve 200.

Figure 4:
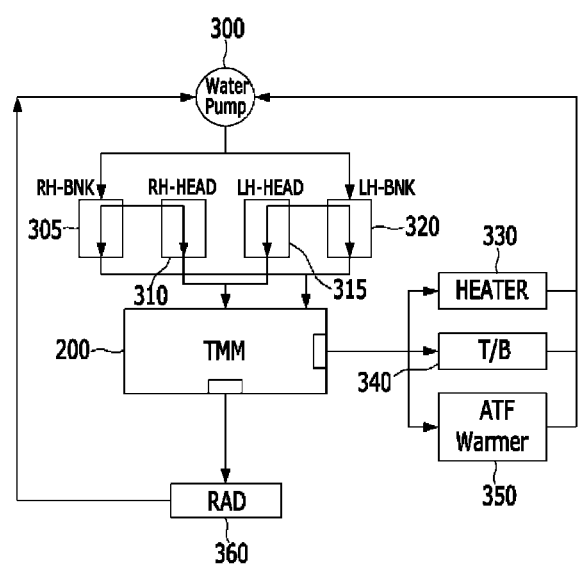
FIG. 4 is a schematic diagram showing a coolant flow of an engine according to the present invention.

FIG. 4 is a schematic diagram illustrating coolant flow in an engine according to various embodiments of the present invention.

Referring to FIG. 4, an engine includes a right cylinder bank 305, a right cylinder head 310, a left cylinder bank 320, a left cylinder head 315, a coolant control valve 200, a radiator 360, a heater 330, a throttle body 340, an automatic transmission fluid (ATF) warmer 350, and a coolant pump 300.

As shown in FIG. 4, the coolant control valve 200 is disposed to selectively supply a coolant to the radiator 360, and the coolant control valve 200 is disposed to selectively supply the coolant to the heater 330, the throttle body 340, and the automatic transmission fluid warmer 350.

In addition, the coolant passing through the radiator 360, the heater 330, the throttle body 340, and the automatic transmission fluid warmer 350 circulate through the coolant control valve 200 again by the coolant pump 300 through the right cylinder bank 305, the right cylinder head 310, the left cylinder bank 320, and the left cylinder head 315.

The coolant exhausted from the right cylinder head 310 and the left cylinder head 315 are supplied together to one side of the coolant control valve 200, and the coolant exhausted from the right cylinder bank 305 and the left cylinder bank 320 are supplied together to the other side of the coolant control valve 200.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A coolant control valve of an engine, comprising:
   a cylindrical valve in which a space is formed along a length directional center axis thereof, a first inlet through which a coolant flows being formed at one end of the cylindrical valve, an outlet being formed at an outer surface of the cylindrical valve in the space, a first convex surface and a second convex surface being sequentially formed along the length direction in an exterior circumferential surface of the cylindrical valve and a second inlet through which the coolant flows into the space being formed at the outer surface corresponding to a recess portion formed between the first convex surface and the second convex surface;
   a valve housing in which the cylindrical valve is provided to be rotatable with respect to the center axis;
   a first inflow pipe connected to the valve housing and transmitting the coolant to the space through the first inlet;

a second inflow pipe connected to the valve housing and transmitting the coolant to the space through the second inlet; and a driver provided at one side of the valve housing to rotate the cylindrical valve with respect to the center axis.

2. The coolant control valve of the engine of claim 1, further comprising:

an outlet pipe connected to the valve housing corresponding to the outlet and transmitting the coolant from the space to the outside through the outlet;

a sealing member to which an end of the outlet pipe is inserted, and a front end surface of the sealing member is formed to correspond to one of the first convex surface or the second convex surface of the cylindrical valve; and an elastic member elastically supporting the sealing member so as to be closely attached to one of the first convex surface and the second convex surface.

3. The coolant control valve of the engine of claim 2, wherein one of the first inflow pipe or the second inflow pipe is connected with a right cylinder bank and a right cylinder head, and the other of the first inflow pipe or the second inflow pipe is connected with a left cylinder bank and a left cylinder head.

4. The coolant control valve of the engine of claim 2, wherein the sealing member has a cylindrical pipe structure in which a front end of the outlet pipe is inserted, and the elastic member is a wave spring provided along an exterior circumferential surface of the outlet pipe to elastically support the sealing member.

5. The coolant control valve of the engine of claim 2, wherein a curved surface having a predetermined curvature radius for inflow of the coolant is formed at an edge where the second inlet is formed in the outer surface of the cylindrical valve.

6. The coolant control valve of claim 2, wherein the driver includes:

a motor housing provided adjacent to the valve housing; and a motor installed in the motor housing to rotate the cylindrical valve.

7. The coolant control valve of claim 2, wherein the first convex surface, the second convex surface, and the recess portion are sequentially formed along a rotation direction of the cylindrical valve, and the second inlet is formed with a predetermined gap along the recess portion.

8. The coolant control valve of the engine of claim 2, wherein the outlet includes a first outlet and a second outlet, and the outlet pipe includes a first outlet pipe corresponding to the first outlet and a second outlet pipe corresponding to the second outlet.

9. The coolant control valve of the engine of claim 8, wherein one of the first outlet pipe or the second outlet pipe is connected with a radiator that cools the coolant, and the other of the first outlet pipe or the second outlet pipe is connected with several cooling lines including to a heater heating air inside a vehicle, to a throttle body disposed to control an amount of intake, to an automatic transmission fluid warmer provided to heat transmission oil.

* * * * *